US005640208A

United States Patent [19]
Fujinami

[11] Patent Number: 5,640,208
[45] Date of Patent: Jun. 17, 1997

[54] VIDEO SIGNAL ENCODING IN ACCORDANCE WITH STORED PARAMETERS

[75] Inventor: Yasushi Fujinami, Kanagawa, Japan

[73] Assignee: Sony Corporation, Tokyo, Japan

[21] Appl. No.: 428,841

[22] Filed: Apr. 25, 1995

Related U.S. Application Data

[63] Continuation of Ser. No. 147,584, Nov. 5, 1993, abandoned, which is a continuation-in-part of Ser. No. 901,676, Jun. 22, 1992, abandoned.

[30] Foreign Application Priority Data

| Jun. 27, 1991 | [JP] | Japan | 3-182915 |
| May 29, 1992 | [JP] | Japan | 4-163647 |
| Nov. 13, 1992 | [JP] | Japan | 4-328782 |

[51] Int. Cl.$^6$ .................................... H04N 7/32
[52] U.S. Cl. ........................... 348/413; 348/699
[58] Field of Search ................ 348/384, 390, 348/405, 409, 413, 416, 420, 699, 410, 411, 412, 415; 382/232, 236, 238; H04N 7/133, 7/137

[56] References Cited

U.S. PATENT DOCUMENTS

| 4,691,233 | 9/1987 | Acampora . | |
| 4,746,978 | 5/1988 | Shimura | 348/405 |
| 4,999,704 | 3/1991 | Ando . | |
| 5,038,209 | 8/1991 | Hang | 348/405 |
| 5,134,476 | 7/1992 | Aravind et al. . | |
| 5,136,371 | 8/1992 | Savatier et al. | 348/409 |
| 5,144,424 | 9/1992 | Savatier . | |
| 5,144,426 | 9/1992 | Tanaka et al. | 348/409 |
| 5,146,325 | 9/1992 | Ng | 348/384 |
| 5,198,901 | 3/1993 | Lynch | 348/413 |
| 5,218,435 | 6/1993 | Lin et al. | 348/409 |
| 5,291,282 | 3/1994 | Nakagawa et al. | 348/415 |
| 5,337,049 | 8/1994 | Shimoda | 348/390 |

FOREIGN PATENT DOCUMENTS

| 0469648 | 2/1992 | European Pat. Off. . |
| 0475251 | 3/1992 | European Pat. Off. . |
| 0480353 | 4/1992 | European Pat. Off. . |
| 0520789 | 12/1992 | European Pat. Off. . |
| 0540961 | 5/1993 | European Pat. Off. . |
| 0541302 | 5/1993 | European Pat. Off. . |

OTHER PUBLICATIONS

Signal Processing: Image Communication, vol. 2, No. 2, 1 Aug. 1990, Amsterdam, NL pp. 127–144, XP243473 A. Puri et al. 'Video Coding with Motion–Compensated Interpolation for CD–ROM Applications' paragraph 5.

Signal Processing: Image Communication, vol. 3, No. 4, 1 Sep. 1991, Amsterdam, NL pp. 313–320, XP234972 J. Katto et al. 'Variable Bit–Rate Coding Based on Human Visual System'; paragraph 2.

*Primary Examiner*—Tommy P. Chin
*Assistant Examiner*—Richard Lee
*Attorney, Agent, or Firm*—William S. Frommer; Alvin Sinderbrand

[57] ABSTRACT

A motion vector detected by a motion detector (2) and a quantizing parameter and a frame structure determined by a controller (4) are stored in a memory (5). The data thus stored is supplied to an encoder (3) which carries out the encode processing corresponding to the stored data. Thus, the data are coded via multiple paths which can reduce restrictions from the standpoint of time and also reduce the scale of hardware need for encoding.

41 Claims, 5 Drawing Sheets

I : Intra-Coded Picture
P : Predictive-Coded Picture
B : Bidirectionally Predictive-Coded Picture

FIG. 5

| Frame Structure \ Mode | Intra-Coded Picture Mode | Forward Predictive-Coded Picture Mode | Backward Predictive-Coded Picture Mode | Bidirectionally Predictive-Coded Picture Mode |
|---|---|---|---|---|
| I Picture | O | — | — | — |
| P Picture | O | O | — | — |
| B Picture | O | O | O | O |

O : Predictive Mode That Can Be Selected

VIDEO SIGNAL ENCODING IN ACCORDANCE WITH STORED PARAMETERS

This application is a continuation of application Ser. No. 08/147,584, filed Nov. 5, 1993, now abandoned which is a continuation-in-part of application Ser. No. 07/901,676, filed Jun. 22, 1992 now abandoned.

BACKGROUND OF THE INVENTION

1. Field of the Invention

The present invention relates to a video coder suitable for use in recording data representing a moving image on a record medium such as a disk or the like while compressing the amount of moving image data that is recorded.

2. Description of the Related Art

The amount of video data representing a moving image becomes enormous as compared with that of audio data, and as a result, the amount of video data has to be compressed when video data is recorded on a record medium. A recently developed technique for compressing the data amount employs a coding apparatus for compressing a data amount of video data representing a moving image and then records the compressed recording video data of a moving image on a record medium.

However, most of the conventional coders are designed to code video data in a real time fashion, and in most cases, only one path is formed, which is responsible for the following problems:

1. Encoding is not started until material data is input;
2. Encoding cannot be started over again;
3. Fine control, such as improving the picture quality of a particular portion is impossible; and
4. The required hardware becomes large in scale because the processing must be accomplished at the frame rate.

A conventional method of compressing video data representing a moving image employs a compression system at a variable rate. In this compression method, in order to keep an image quality uniform, a large amount of codes is assigned to a complicated image and a lesser amount of codes is assigned to a simple image. Therefore, according to this method, an image of a uniform image quality that could not be obtained when video data is compressed at the fixed rate can be reproduced, and an image can be reproduced for a long period of time.

On the other hand, a record medium, such as a disk or the like has a fixed total amount of data that can be recorded thereon and cannot record data whose amount is beyond the upper limit of the total amount of data to be recorded.

Accordingly, when video data representing complicated images are made continuous is compressed at the variable compression rate and recorded on the disk, it is frequently observed that such video data exceeds the total amount of data that can be recorded on the disk and cannot be recorded on the disk.

Further, when video data representing simple images are made continuous is compressed at the variable compression rate and recorded on the disk, a recording area of the disk that should be recorded upon remains utilized.

OBJECTS AND SUMMARY OF THE INVENTION

Therefore, it is an object of the present invention to provide an improved video coder in which the aforesaid shortcomings and disadvantages of the prior art can be eliminated.

More specifically, it is an object of the present invention to provide a video coder in which the encoding can be started at an arbitrary timing and started over again, if necessary.

Another object of the present invention is to provide a video coder in which the image quality of a particular portion of the image can be improved.

A further object of the present invention is to provide an encoder which can make a coding bit stream of a variable rate to produce a highest image quality within a range of a predetermined total amount of image data.

Yet a further object of the present invention is to provide an encoder which can produce a coding bit stream of variable rate that provides highest image quality by a limited range of total amount of data.

As a first aspect of the present invention, a video coder for compressing and encoding input video data is comprised of a controller for setting coding parameters, a first encoder for coding the video data into first coded video data for evaluating the coding parameters on the basis of the coding parameters, a memory for storing the coding parameters, a controller for varying the coding parameters stored in the memory into other coding parameters on the basis of the first coded video data, and a second encoder for coding the same video data that is coded in the first encoder into second coded video data for transmission on the basis of the other coding parameters.

In accordance with a second aspect of the present invention, a video coding method for compressing an amount of video data comprises the step of setting coding parameters, storing the coding parameters in a memory, first coding the video data into first coded video data for evaluating the coding parameters on the basis of the coding parameters, varying the coding parameters stored in the memory into other coding parameters on the basis of the first coded video data, and second coding the same video data that is coded in the step of the first coding into second coded video data for transmission on the basis of the other coding parameters.

In accordance with a third aspect of the present invention, a video coder for compressing and encoding input video data is comprised of a controller for setting coding parameters, a first encoder for coding the video data into first coded video data for evaluating the coding parameters on the basis of the coding parameters, a memory for storing the coding parameters, a comparator for comparing amount of the first coded video data with predetermined amount of data, a controller for varying the coding parameters stored in the memory into other coding parameters on the basis of comparative result of the comparator, and a second encoder for coding the same video data that is coded in the first encoder into second coded video data for transmission on the basis of the other coding parameters.

In accordance with a fourth aspect of the present invention, a video coding method for compressing an amount of video data comprises the step of setting coding parameters, storing the coding parameters in a memory, first coding the video data into first coded video data for evaluating the coding parameters on the basis of the coding parameters, comparing amount of the first coded video data with predetermined amount of data, varying the coding parameters stored in the memory into other coding parameters on the basis of comparative result of the step of comparing, and second coding the same video data that is coded in the step of the first coding into second coded video data for transmission on the basis of the other coding parameters.

BRIEF DESCRIPTION OF THE DRAWINGS

A better understanding of other objects, features, and advantages of the above and the present invention can be gained from a consideration of the following detailed description of an illustrative embodiment thereof, in conjunction with the figures of the accompanying drawings, in which.

DETAILED DESCRIPTION OF THE PREFERRED EMBODIMENT

Figure 1:
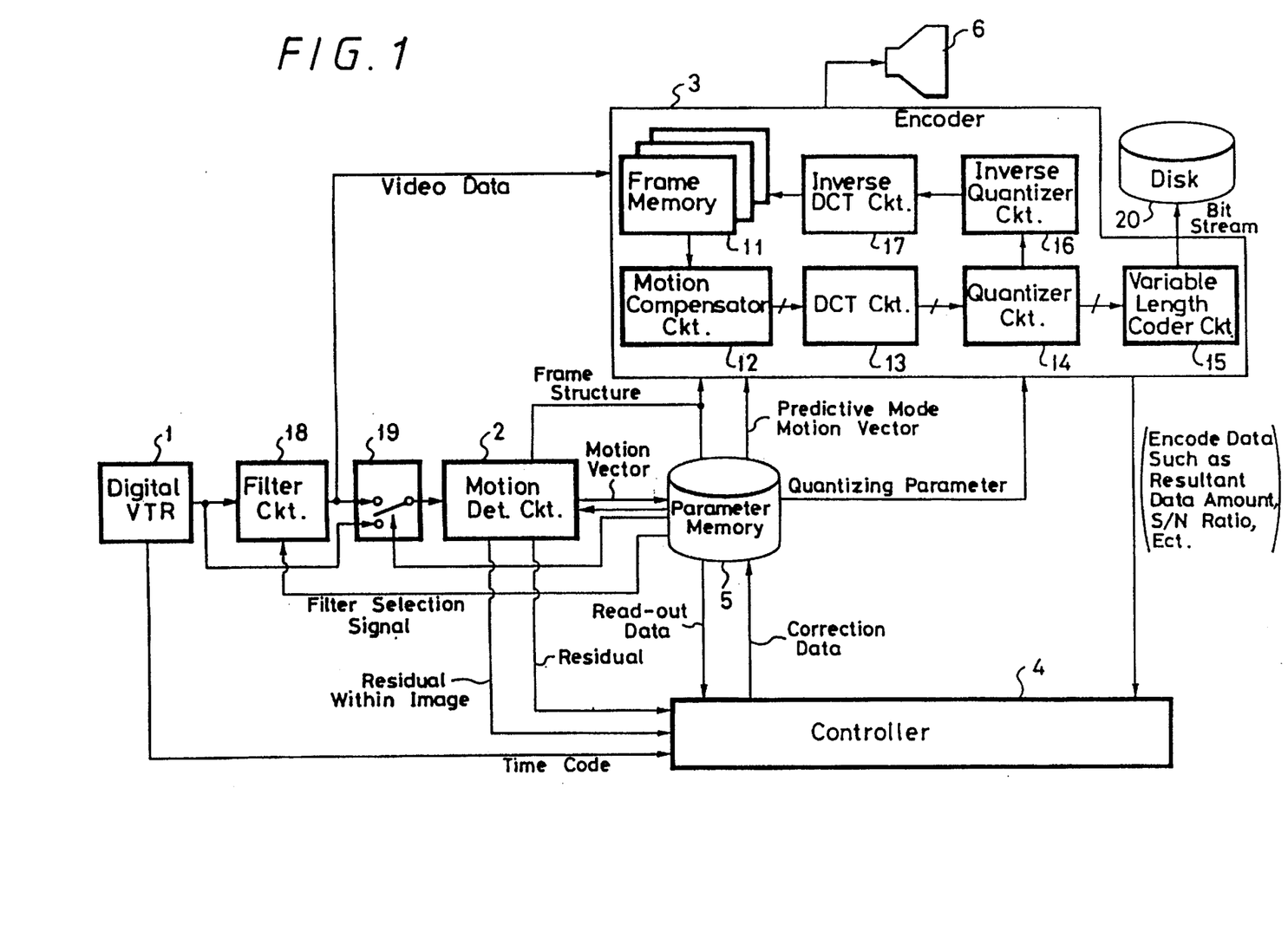
FIG. 1 is a block diagram of an arrangement of a video coder according to an embodiment of the present invention.

The invention will now be further described with references to FIG. 1 of the drawings in which a video coder according to an embodiment of the present invention is shown to include a digital video tape recorder (digital VTR). A digital VTR 1 plays back video data and supplies the reproduced video data to a filter circuit 18 and a switch circuit 19. Also, the digital VTR 1 outputs a time code corresponding to the reproduced video data to a controller 4. The filter circuit 18 is a pre-filter formed of a plurality of filters having different characteristics. The filter circuit 18 selects a proper filter on the basis of a filter selection signal supplied thereto from a parameter memory 5. The video data from the digital VTR 1 is filtered out by such selected filter.

Alternatively, the filter circuit 18 may be formed of a single filter whose tap coefficient is changed on the basis of the filter selection signal supplied thereto from the parameter memory 5.

The switch circuit 19 is connected at its one input terminal with an output terminal of the filter circuit 18 and also connected at the other input terminal thereof with an output terminal of the digital VTR 1. Accordingly, the switch circuit 19 selects video data from the filter circuit 18 or video data from the digital VTR 1 in response to a switching signal supplied thereto from the parameter memory 5 and supplies the selected video data to a motion detector circuit 2. The motion detector circuit 2 detects a motion of a corresponding moving image from the input video data and supplies the controller 4 and the parameter memory 5 with a signal corresponding to a detected result.

The controller 4 calculates parameters and supplies and stores calculated parameters in the parameter memory 5. Various parameters stored in the parameter memory 5 are read out therefrom and supplied to the motion detector circuit 2, an encoder 3, the filter circuit 18 and the switch circuit 19.

As shown in FIG. 1, the encoder 3 comprises a frame memory 11 which stores video data, a motion compensator circuit 12 which calculates a difference by using a motion vector, which is known as "motion compensation", a discrete cosine transform (DCT) circuit 13 for processing data in a DCT fashion, a quantizer circuit 14 for quantizing data output from the DCT circuit 13, a variable length coder circuit 15 which converts the data quantized by the quantizer circuit 14 into a variable length code, an inverse quantizer circuit 16 for inverse-quantizing the data quantized by the quantizer circuit 14 and an inverse DCT circuit 17 for processing the data inverse-quantized by the inverse quantizer circuit 16 in an inverse quantizing fashion.

The encoder 3 encodes the video data at a variable rate and supplies a variable rate bit stream (encoded data) to a disk 20. Further, the data processed by the encoder 3 is supplied to and displayed on a monitor 6.

Operation of the video coder according to the present invention will be described below. The digital VTR 1 reproduces video data from a video tape, not shown, and outputs the reproduced video data to the filter circuit 18 and the switch circuit 19. The filter circuit 18 selects a proper filter from a plurality of filters incorporated therein on the basis of the filter selection signal from the parameter memory 5. The selected filter in the filter circuit 18 filters out the video data from the digital VTR 1 and supplies the filtered-out video data to the switch circuit 19. The switch circuit 19 selects either the video data directly supplied thereto from the digital VTR 1 or the filtered-out video data from the filter circuit 18, e.g., the video data from the filter circuit 18 and outputs the same to the motion detector circuit 2.

Figure 2:
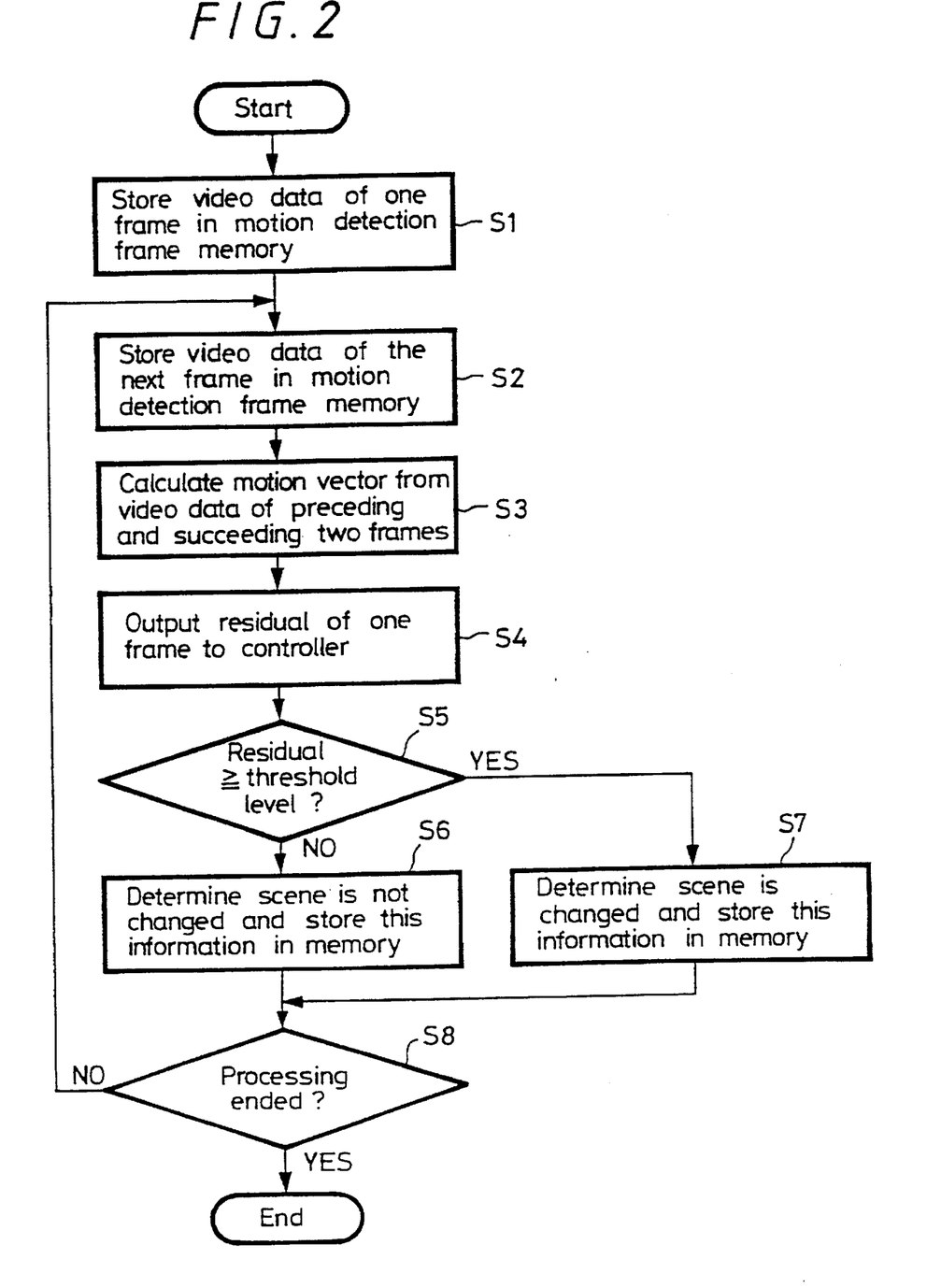
FIG. 2 is a flowchart to which reference will be made in explaining operation of the embodiment shown in FIG. 1.

The motion detector circuit 2 detects the change of scene in accordance with a flowchart of FIG. 2, for example.

As shown in FIG. 2, following the start of operation in a step S1, the motion detector circuit 2 stores data of one frame input thereto from the digital VTR in a motion detecting frame memory housed therein in step S1. In the next step S2, image of the next frame is similarly stored in a motion detecting frame memory housed in the motion detector circuit 2. In the next step S3, a motion vector is calculated from video data of two succeeding frames. Image data is divided into blocks of a predetermined size (e.g., 8×8 pixels) and the motion vector is detected at every block. The motion vector thus obtained is supplied to and stored in the parameter memory 5.

The motion detector circuit 2 calculates one frame of residual information (absolute difference sum or square sum of data predicted by the resultant motion vector and present data) and outputs a calculated result to the controller 4 in step S4. In the next decision step S5, the controller 4 compares the residual information input from the motion detector circuit 2 with a predetermined threshold level that has been previously set. If the residual information is smaller than the threshold level, as represented by a NO at decision step S5, then the processing proceeds to step S6, whereat it is determined that the scene is not changed and this information is stored in a motion detection frame memory (not shown). If on the other hand the residual information is larger than the threshold level, as represented by a YES in decision step S5, then the processing proceeds to step S7, whereat it is determined that the scene is changed. The controller 4 stores the information concerning the change of scene in the memory housed therein. A similar processing is repeated until video data are found to be thoroughly processed (in decision step S8). In this way, the controller 4 judges the frame structure of the input video data and transfers and stores the frame structure thus determined in the parameter memory 5.

The frame structure will be described with reference to FIG. 4.

Figure 4:
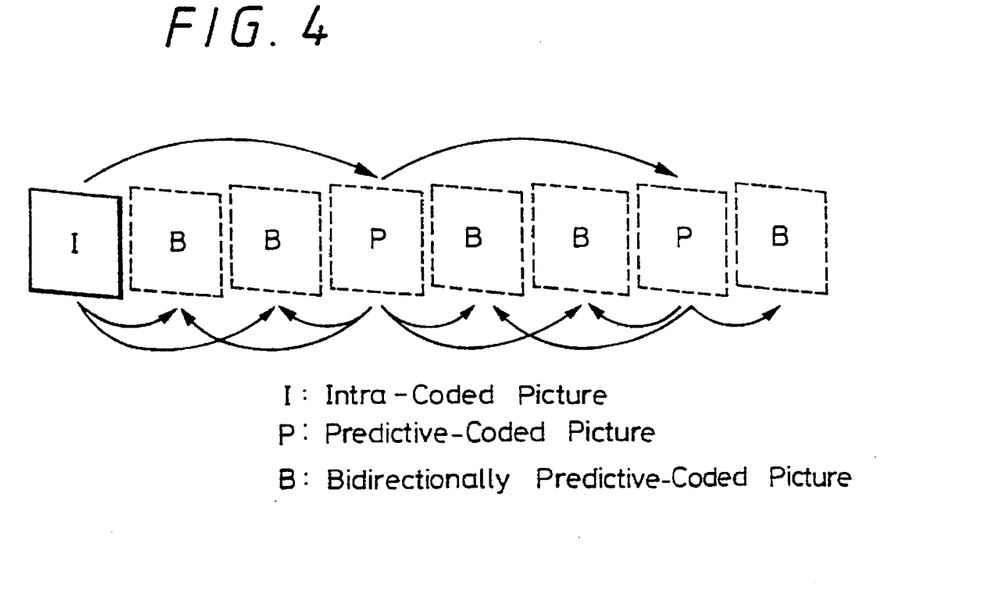
FIG. 4 is a diagram used to explain a frame structure used in the embodiment shown in FIG. 1.

As shown in FIG. 4, it is frequently observed that video data of successive frames from a time standpoint are correlated or associated with one another. Accordingly, a difference between video data of successive frames from a time standpoint is calculated and the difference therebetween is transmitted, thereby compressing the amount of video data. Images or pictures transmitted on the basis of this principle are classified into three images, i.e., I picture (intra-coded picture), P picture (predictive-coded picture) and B picture (bidirectionally predictive-coded picture).

The I picture uses only a closed information within one picture thereof when encoded and is needed to effect random access and high speed playback. The P picture (forward predictive-coded picture) uses the preceding I picture or P picture, which is already decoded, as a reference picture to calculate a difference). In actual practice, the more efficient one of the coding process for coding a difference between a picture and a predictive picture whose motion is compensated (inter-coding process) and the coding process for coding a picture without calculating a difference (intra-coded process) is selected as the predictive mode for each macro-block (e.g., 16×16 pixels) as unit. The B picture uses as a predictive picture one of the preceding and already-decoded I picture or P picture, the succeeding and already-decoded I picture or P picture or the interpolated picture formed by the former two kinds of pictures. Thus, an amount of data concerning an afterimage of a moving object, for example, can be compressed. In practice, the most efficient one of the inter-coded and intra-coded processes is selected as the mode for each macro-block.

Figure 5:
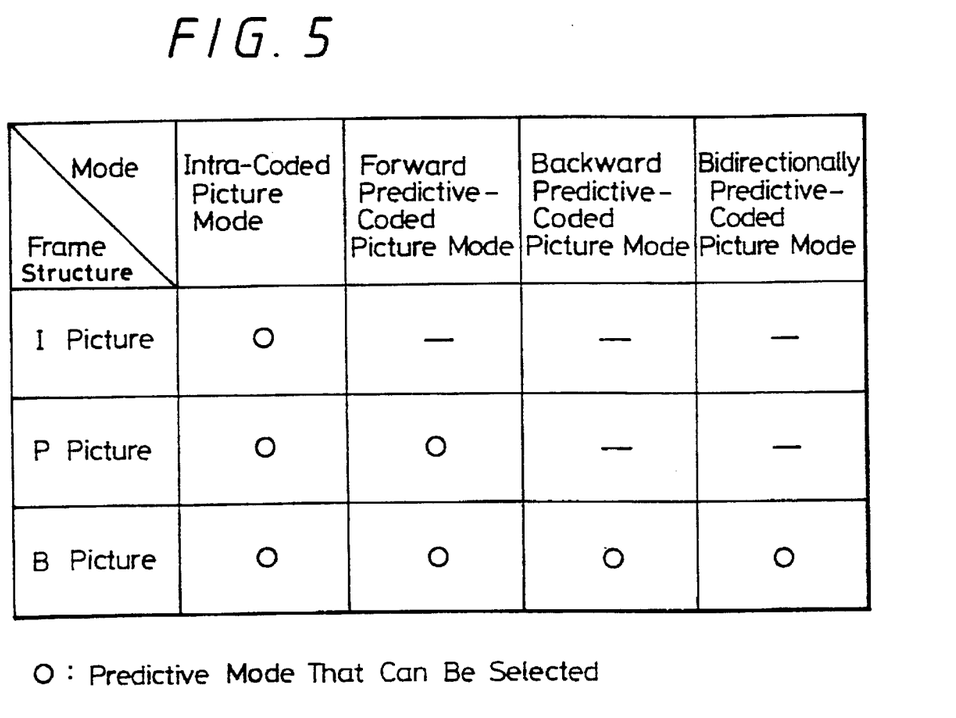
FIG. 5 is a table used to explain a relation between the frame structures and the predictive modes.

FIG. 5 of the accompanying drawings shows a table of predictive modes that can be selected for each macro-block in dependence on the respective frame structures.

The frame structure indicates the kinds of frames composed of the I picture, P picture and B picture. The sequential order of the frame structures is generally determined in such a pre-determined sequence as to dispose, for example, one P picture between two I pictures and to dispose two B pictures between two I pictures and P pictures or the like. When the change of scene occurs, the above-mentioned sequence is not always kept and suitable processing such as to select the frame structures of, for example, the I picture is necessary.

This selected frame structure is read out from the parameter memory 5 and supplied to the motion detector circuit 2 and is thereby used to calculate a motion vector. Further, this selected frame structure is also supplied to the motion compensator circuit 12 in the encoder 3 and used to calculate a motion compensation amount, as will be described later.

Furthermore, this selected frame structure is also supplied to the controller 4. The controller 4 determines a filter that is applied to each frame in the filter circuit 18 on the basis of data, such as information input by the user in a manual fashion, a frame structure from the parameter memory 5, residual information from the motion detector circuit 2 or the like. The filter information determined by the controller 4 is supplied to and stored in the parameter memory 5. The parameter memory 5 outputs the filter selection signal to the filter circuit 18. In this case, the filter selection signal is output such that a loose filter (having a wide band) is selected for the I picture, for example, and that a sharp filter (having a narrow band) is selected for the P picture and B picture. If residual information is large, then the filter selection signal is output in such a manner as to select the above-mentioned sharp filter. Then, the filter circuit 18 selects a filter on the basis of the filter selection signal.

The motion detector circuit 2 calculates a mean value of pixels and an absolute residual (absolute value difference or square sum) of respective pixels in respective macro-blocks and outputs the same to the controller 4 as an intra-coded picture residual. The controller 4 operates to determine the predictive mode of each macro-block on the basis of the already-determined frame structure, the residual and the intra-coded picture residual calculated by the motion detector circuit 2 when the change of scene is detected. The predictive mode is used to set a reference picture that is used by the motion compensator circuit 12 in the encoder 3 to calculate the difference. One of four modes, i.e., the intra-coded picture mode, forward predictive-coded picture mode, backward predictive-coded picture mode and bidirectionally predictive-coded picture mode, is selected as the predictive mode.

Figure 6:
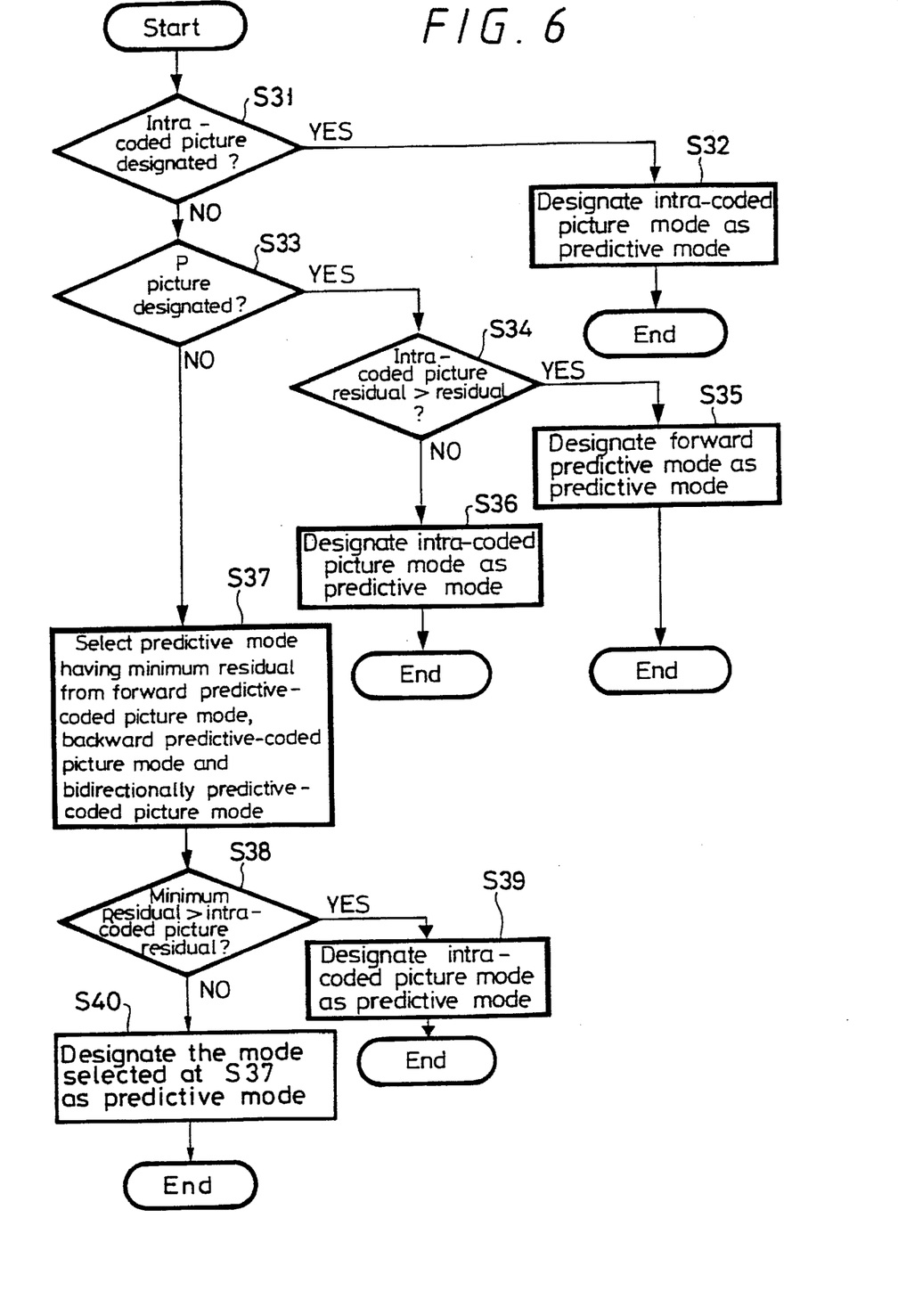
FIG. 6 is a flowchart to which references will be made in explaining operation for determining the predictive mode according to the embodiment shown in FIG. 1.

The predictive mode is determined in accordance with the flowchart of FIG. 6, in which, following the Start of operation, it is determined in decision step S31 by the controller 4 whether or not the frame structure is designated as the I picture. If the frame structure is designated as an I picture, as represented by a YES at decision step S31, then the processing proceeds to step S32, whereat the intra-coded picture mode is designated as the predictive mode. If the frame structure is not designated as an I picture, as represented by a NO at decision step S31, then the processing proceeds to the next decision step S33. In decision step S33, it is determined whether or not a P picture is designated as the frame structure. If the P picture is designated as the frame structure, as represented by a YES at decision step S33, then the processing proceeds to the next decision step S34, whereat the residual calculated by the motion detector circuit 2 and the intra-coded picture residual are compared with each other. If the intra-coded picture residual is larger than the residual, as represented by a YES at decision step S34, then the processing proceeds to step S35. In step S35, the forward predictive mode is designated as the predictive mode because it is considered that the encoding efficiency can be improved more if the difference is coded by using the predictive mode. If the intra-coded picture residual is smaller than the residual, as represented by a NO at decision step S34, then the processing proceeds to step S36, whereat the intra-coded picture mode is designated as the predictive mode because it is considered that the encoding efficiency can be improved by using the intra-frame coding. Further, if the frame structure is not a P picture as represented by a NO at decision step S33, then it is considered that a B picture is designated as the frame structure and thus the processing proceeds to step S37. In step S37, the one of the three modes of forward predictive-coded picture mode, backward predictive-coded picture mode and bidirectionally predictive-coded picture mode and whose residual becomes minimum is assumed to be a predictive mode. In the next decision step S38, it is determined whether or not the minimum residual is larger than the intra-coded picture residual. If the minimum residual is larger than the intra-coded picture residual, as represented by a YES at decision step S38, then the processing proceeds to step S39, whereat the predictive mode is designated as the intra-coded picture mode because intra-frame coding can optimize the coding efficiency. If the minimum residual is smaller than the residual within the picture, as represented by a NO at decision step S38, then the processing proceeds to step S40, whereat the mode selected at step S37 is designated as a predictive mode.

Having determined the predictive mode, the controller 4 supplies the predictive mode parameter thus determined to the parameter memory 5, in which it is stored. This predictive mode parameter is supplied to the motion compensator circuit 12 to be used by the latter.

When the intra-coded picture mode is designated as the frame structure, the motion compensator circuit 12 outputs the input image data as it is. At that time, the motion vector is not supplied to the motion compensator circuit 12 or it can be neglected.

When the forward predictive-coded picture mode is designated as the predictive mode, the motion compensator circuit 12 extracts a predictive picture from the forward predictive frame stored in the frame memory 11 by utilizing the motion vector supplied to circuit 12 and calculates and outputs a difference between the predictive picture and an input picture data.

When the backward predictive mode is designated, then the motion compensator circuit 12 extracts a predictive image from the backward predictive frame stored in the frame memory 11 by utilizing the motion vector supplied to the circuit 12.

When the bidirectionally predictive-coded picture mode is designated as the predictive mode, the motion compensator circuit 12 extracts the forward predictive picture from the forward predictive frame stored in the frame memory 11 by utilizing two motion vectors of the forward and rearward predictive pictures. Further, the motion compensator circuit 12 extracts the predictive picture from the rearward predictive frame and averages the thus extracted forward and rearward predictive pictures to provide a predictive picture and calculates and outputs a difference between the predictive picture and the input picture data.

Figure 3:
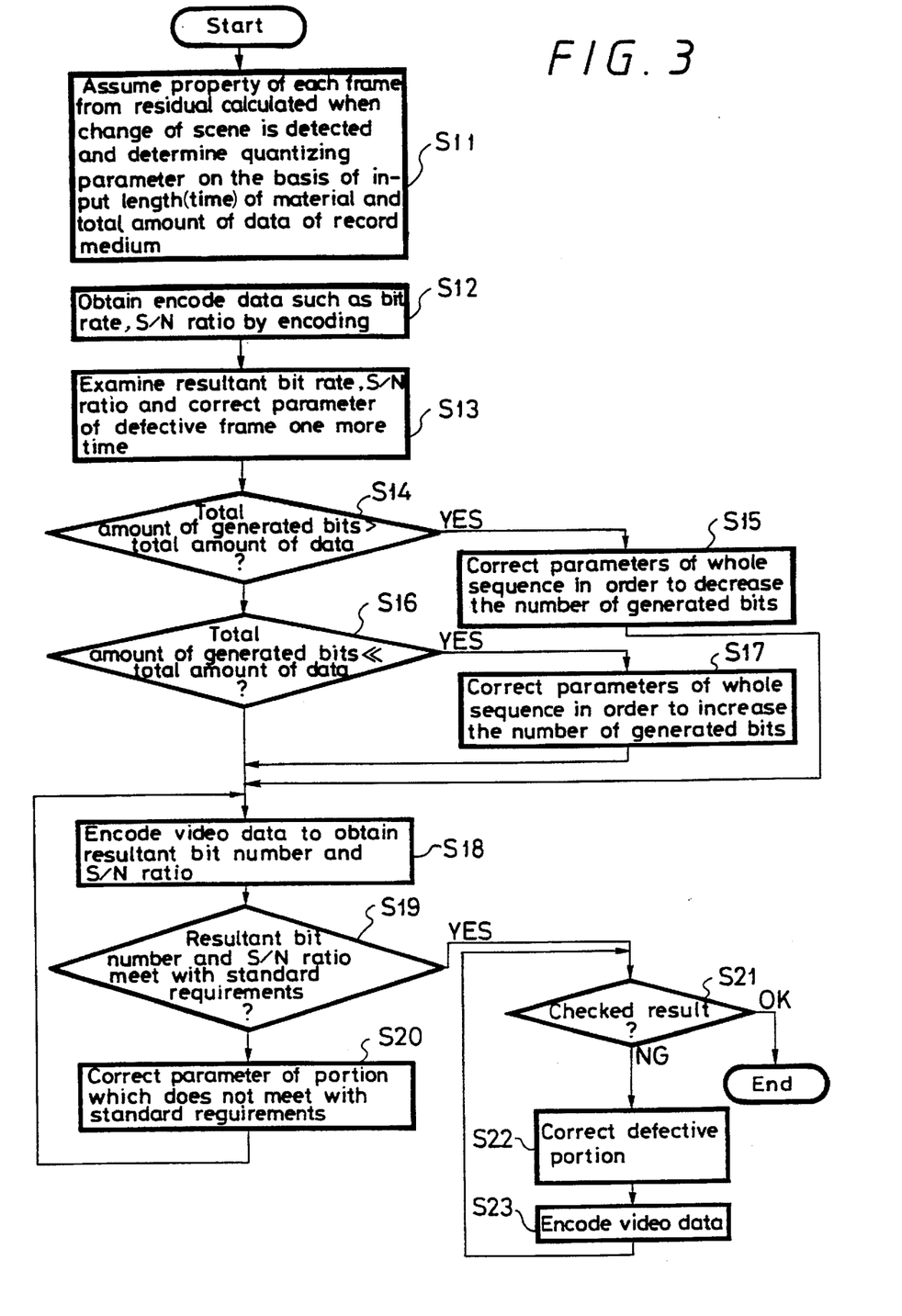
FIG. 3 is a flowchart to which reference will be made in explaining an encoding processing according to the embodiment shown in FIG. 1.

When the motion vector and the frame structure are determined as described above, the processing shown in a flowchart of FIG. 3 is executed. More specifically, in step S11, the controller 4 assumes a property of each frame from the residual calculated by the motion detector circuit 2 when the change of scene is detected, and the quantizing parameter is determined on the basis of this assumption, input length (time) of a material recorded on a video tape set on the digital VTR 1 and a total amount of data that can be recorded on the disk 20.

In other words, the quantizing parameter is determined such that the amount of resultant codes from the material recorded on the video tape set on the digital VTR 1 becomes the same (or falls within a tolerance in which they can be regarded as the same) as the total amount of data in the disk 20.

That is, if the length of the material, for example, is long, then the quantizing parameter is made large in order to suppress the amount of the resultant codes. If the total amount of data in the disk 20 is large, then the quantizing parameter is made small in order to effectively utilize the recording area.

Alternatively, the quantizing parameter may be determined by setting the target value of the amount of the resultant codes from the material to be a little smaller than the total amount of data.

The quantizing parameter is used to set a quantization step size of the quantizer circuit 14 in the encoder 3. To be more concrete, this quantizing parameter is used as a divisor when data output from the DCT circuit 13, for example, is divided by a predetermined value.

Having determined the quantizing parameter, the controller 4 supplies the quantizing parameter thus determined to the parameter memory 5, in which it is stored. This quantizing parameter is supplied from the parameter memory 5 to the quantizer circuit 14 and determines the quantization step size of the quantizer circuit 14.

The encoder 3 operates to encode the video data supplied thereto from the digital VTR 1 in response to the motion vector, the frame structure, the predictive mode and the quantizing parameter supplied thereto from the parameter memory 5. Then, the encoder 3 outputs resultant encode data (bit rate and S/N ratio) to the controller 4 in step S12. The controller 4 examines the resultant bit rate, the S/N ratio or the like supplied thereto from the encoder 3 and sets or corrects a parameter of a defective frame one more time in step S13. That is, if the resultant bit number cannot be reduced sufficiently (i.e., amount of data cannot be compressed sufficiently) or satisfactory S/N ratio cannot be obtained, then the parameter thus set is regarded as an improper one and a parameter is set one more time.

Further, the total amount of resultant codes and the total amount of data in the disk 20 are compared with each other in steps S14, S16. If the total amount of resultant codes is larger than the total amount of data in the disk 20, as represented by a YES at decision step S14, then the processing proceeds to step S15, whereat the following operations of parameters are carried out to thereby suppress the amount of resultant codes.

More specifically, quantizing parameters of a whole of or a part of the sequence (compression coding processing) are set to be larger one more time. A frame structure will be corrected and a frequency of B picture will be increased, if necessary. Further, the predictive mode is corrected and a frequency of intra-macro block is decreased or a frequency of a bidirectional predictive macro block is increased. Furthermore, the filter that had been served as the pre-filter of the filter circuit 18 is changed to a filter having a characteristic to suppress more effectively a high band component of input video data.

If on the other hand the total amount of resultant codes is much less than the total amount of data in the disk 20, as represented by a YES at decision step S16, then the processing proceeds to step S17, whereat the following operations are carried out to thereby increase the amount of resultant codes.

More specifically, quantizing parameters of a whole of or a part of the sequence are set to be smaller one more time. A frame structure will be corrected and a frequency of B picture will be decreased, if necessary. Further, the predictive mode is corrected and a frequency of intra-macro block is increased or a frequency of a bidirectional predictive macro block is decreased. Furthermore, the filter that had been served as the pre-filter of the filter circuit 18 is changed to a filter having a characteristic that cannot suppress a high band component of input video data. Alternatively, under the following control operation, the switch circuit 19 is operated such that the filter circuit 18 is by-passed so as to allow video data from the digital VTR 1 to be directly input to the encoder 3.

The controller 4 determines on the basis of the coded parameter stored in the parameter memory 5 whether or not a trouble occurs when video data whose frequency band is not suppressed by the filter circuit 18 is directly input to the encoder 3 from the digital VTR 1. In other words, the controller 4 determines whether or not the amount of resultant codes from the video data is vehemently increased. If the controller 4 determines that no trouble occurs, then the controller 4 supplies and stores switching information in the parameter memory 5. This switching information is supplied from the parameter memory 5 to the switch circuit 19 as a switching signal. Then, on the basis of this switching signal, the switch circuit 19 selects video data from the digital VTR 1 instead of the video data from the filter circuit 18, whereby video data whose frequency band is not limited is input to the encoder 3.

In the next step S18, the encoder 3 encodes again the video data in accordance with the parameter thus set again. The resultant bit number and S/N ratio from the encoder 3 are supplied to the controller 4 similarly as described above. In the next decision step S19, it is determined by the controller 4 whether or not the resultant bit number and S/N ratio meet with standard requirements. If they do not meet with standard requirement, as represented by a NO at decision step S19, then the processing proceeds to the next step S20, whereat the parameter of the portion which does not meet with the standard requirements is corrected. Then, the processing returns to step S18, wherein the encoder 3 encodes the video data one more time.

If the resultant bit number and S/N ratio, which meet with standard requirements, are obtained, as represented by a YES at decision step S19, then the processing proceeds to the next decision step S21, whereat the checking by the user is carried out. That is, the picture processed by the encoder 3 is output and displayed on the video monitor 6. In the next step S22, the user corrects a defective portion, if any, while watching the picture displayed on the video monitor 6. In other words, the predictive mode and the quantizing parameter are set one more time via the controller 4 in a manual fashion, and the encoder 3 encodes again the video data in accordance with the corrected parameter in step S23. This processing from steps S21 to S23 is repeated until it is determined visually that the picture has no problem.

If a satisfactory picture is thus obtained, then the bit stream output from the encoder 3 is supplied to a recording apparatus, for being recorded thereby, for example, on a record medium such as a disk or the like. The parameter memory 5 stores all parameters that are adjusted and set as described above. If the parameter is set as described above, then the video data output from the digital VTR 1 can be correctly compressed in data amount into image data set and adjusted as described above and then output.

Processing operations of the encoder 3 will be described next.

Referring back to FIG. 1, the video data input to the encoder 3 from the digital VTR 1 is stored in the frame memory 11 thereof. The motion compensator circuit 12 compensates for the video data stored in the frame memory 11 by using the predictive mode and the motion vector input thereto from the parameter memory 5 to thereby generate a predictive picture. Data of the predictive picture whose motion is compensated for is supplied to the DCT circuit 13, in which it is processed in a DCT fashion. The DCT processing expresses a picture not by the pixel level but by the amount of frequency component of cosine function contained therein. For example, a two-dimensional DCT converts a pixel block of 8×8 pixels into a coefficient block of 8×8 cosine function components. Accordingly, in a natural picture picked up by a television camera, for example, it is frequently observed that the above coefficient block is presented as a smooth signal. In this case, if the video data is processed in a DCT fashion, the amount of data can be reduced efficiently.

When the quantizer circuit 14 quantizes the output of the DCT circuit 13 by a predetermined step size in response to the quantizing parameter supplied thereto from the parameter memory 5, then most of the data thus processed in a DCT fashion become zero and a small amount of large coefficient remains. Then, the output of the quantizer circuit 14 is supplied to the variable length coder circuit 15, in which it is scanned in a zigzag fashion to provide a Huffman code (variable length code) having a set of non-zero coefficient and zero-run indicating the number of zeroes continuously provided in front of the non-zero coefficient. The amount of data in the Huffman code is considerably compressed as compared with the original video data output from the digital VTR 1.

When the P picture or B picture is processed as set forth above, data of a preceding frame is needed from a time standpoint. To prepare such data, the output of the quantizer circuit 14 is inverse-quantized by the inverse-quantizer 16. Then, the inverse-quantized data is processed by the inverse DCT circuit 17 in an inverse-DCT fashion and then stored in the frame memory 11. That is, the same data as that quantized by the quantizer circuit 14 and which is output from the variable length coder circuit 15 is stored in the frame memory 11. When necessary, the motion compensator circuit 12 processes the data in a predetermined manner with reference to the data of the preceding frame stored in the frame memory 11.

The data thus encoded is read out from the frame memory 11 and supplied to the video monitor 6, thereby making it possible to visually confirm the resultant picture thus processed.

In the video coder according to the present invention, since the parameters necessary for the encoding processing are stored, the data are coded via multiple paths, which can reduce restrictions from the standpoint of time and also reduce the scale of a hardware needed for encoding.

As described above, the encoded parameters are varied on the basis of the S/N ratio of the coded data of the video data. Also, the coding parameters are varied such that the amount of data that can be recorded on the disk 20 and the amount of resultant codes of the video data become the same (or they fall in a tolerance so that they can be regarded as the same). Therefore, even when data that can be recorded on the disk 20 whose amount of data to be recorded thereon is fixed is data with a variable rate, such data can be fully recorded on the disk 20 and the recording area of the disk 20 can be prevented from being left unutilized. Also, the picture quality can be prevented from being deteriorated.

Further, since the video coder according to the present invention has encoded parameters prepared therein, only necessary portions can be repeatedly modified, thereby making it possible to effect the finer control operation, While the disk 20 is used as a recording medium in which coded data is recorded as described above, the present invention is not limited thereto.

Further, while the S/N ratio of the coded data is used as a so-called S/N ratio of a signal, this S/N ratio may be understood as a sum of difference or average value of video data that is not yet coded and coded video data at every pixel.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A video coder for compressing and encoding input video data comprising:

means for setting coding parameters;

encode means for encoding said input video data into first coded video data on the basis of said coding parameters;

memory means for storing said coding parameters;

compare means for comparing an amount of data included in said first coded video data with a predetermined amount of data;

control means for varying said coding parameters stored in said memory means on the basis of a comparative result of said compare means, and for generating filter data in accordance with the varied coding parameters;

filter means having a filter characteristic controlled by said filter data for filtering said input video data in accordance with said filter data; and said encode means re-encoding said input video data into second coded video data for transmission on the basis of said varied coding parameters.

2. The video coder according to claim 1, wherein said control means varies said coding parameters stored in said memory means on the basis of a S/N ratio of said first coded video data.

3. The video coder according to claim 1, wherein said coding parameters further include frame structure information which indicates that a frame of said input video data is to be encoded as an intra-coded picture, a predictive-coded picture or a bidirectionally predictive-coded picture by said encode means.

4. The video coder according to claim 1, wherein said coding parameters include predictive mode information which regulates a reference picture, and said encode means encodes said input video data by calculating a difference between said input video data and said reference picture to produce said coded video data.

5. The video coder according to claim 1, wherein said encode means includes quantizing means for quantizing said first and second coded video data respectively and providing corresponding quantized data; and said coding parameters include a quantizing parameter for controlling a quantizing characteristic of said quantizing means.

6. The video coder according to claim 5, further comprising motion detecting means for detecting motion of said input video data and providing a corresponding motion vector as a coding parameter; and wherein said encode means includes inverse quantizing means for inverse-quantizing said quantized data, and wherein said inverse-quantized data is used as a reference frame of video data, and said motion compensation means compensates motion of said reference frame by using the motion vector detected by said motion detecting means.

7. The video coder according to claim 6, wherein said encode means further includes means provided at a preceding stage of said quantizing means for processing said first and second coded video data respectively in a discrete cosine transform (DCT) fashion, and means provided at a succeeding stage of said inverse-quantizing means for processing said inverse-quantized video data in an inverse-DCT fashion.

8. A video coding method for compressing an amount of input video data comprising the steps of:

setting coding parameters;

storing said coding parameters in a memory;

coding said input video data into first coded video data on the basis of said coding parameters;

comparing an amount of data included in said first coded video data with a predetermined amount of data;

varying said coding parameters stored in said memory on the basis of a comparative result of the step of comparing, and generating filter data in accordance with the varied coding parameters;

filtering said input video data in accordance with said filter data; and second re-encoding said input video data into second coded video data for transmission on the basis of the varied coding parameters.

9. The video coding method according to claim 8, wherein said coding parameters stored in said memory are varied on the basis of a S/N ratio of said first coded video data.

10. The video coding method according to claim 8, wherein each said coding and re-coding steps includes the step of quantizing the first and second coded video data respectively to produce quantized data; and said coding parameters include a quantizing parameter which is used to control a quantizing characteristic.

11. The video coding method according to claim 8, wherein said coding parameters include frame structure information which determined a coding system for every frame of said input video data.

12. The video coding method according to claim 8, wherein said coding parameters include predictive mode information which regulates a reference picture, and wherein each said coding and re-coding steps is carried out by calculating a difference between said input video data and said reference picture to produce said first and second coded video data respectively.

13. The video coding method according to claim 8, wherein said coding parameters include a motion vector; and wherein each said coding and re-coding steps includes the step of effecting motion compensation of said first and second coded data respectively in accordance with said motion vector.

14. A video coder for compressing and encoding input video data, comprising:

means for setting coding parameters, said coding parameters including frame structure information and predictive mode information;

means for storing said coding parameters;

encode means for encoding said input video data in accordance with the stored coding parameters to provide first coded video data, said encode means including motion compensation means for generating a predictive frame of video data by compensating motion of a reference frame of video data to produce said predictive frame, the reference frame of video data being selected in accordance with said predictive mode information, and for computing the difference between said input video data and said predictive frame in response to said frame structure information so as to provide said first coded video data; means for ascertaining a signal to noise ratio of said first coded video data;

control means for varying said coding parameters in response to said first coded video data and the ascertained signal to noise ratio; and said encode means being operative to re-encode said input video data in accordance with the varied coding parameters to provide second coded video data.

15. The video coder according to claim 14, wherein said predictive mode information indicates a mode of operation of said encode means; and said encode means is operable in a intra-coded picture mode to intraframe-code said input video data without said predictive frame to provide said coded video data, is operable in a forward predictive-coded picture mode to select a forward predictive frame as said reference frame, and is operable in a backward predictive-coded picture mode to select a backward predictive frame as said reference frame.

16. The video coder according to claim 14, wherein said motion compensation means includes means for averaging a forward predictive frame and a rearward predictive frame when said predictive mode information represents a bidirectionally predictive-coded picture mode, thereby generating said predictive frame of video data.

17. The video coder according to claim 14, wherein said control means includes means for determining amounts of coded video data resulting from the encoding by said encode means of said input video data in an intra-coded picture mode, a forward predictive-coded picture mode, a backward predictive-coded picture mode, and a bidirectionally predictive-coded picture mode; and wherein said control means sets said predictive mode information to indicate the mode in which said encode means provides a minimum amount of coded video data.

18. The video coder according to claim 14, further comprising means for comparing an amount of said first coded video data with a predetermined amount of data, and wherein said control means varies said coding parameters in accordance with said means for comparing.

19. The video coder according to claim 14, further comprising means for recording said second coded video data on a record medium.

20. The video coder according to claim 14, wherein said frame structure information indicates that a frame of said input video data is to be encoded as an intra-coded picture, a predictive-coded picture or a bidirectionally predictive-coded picture by said encode means.

21. The video coder according to claim 20, wherein said encode means encodes said input video data by calculating a difference between said input video data and said predictive frame when said frame structure information indicates that said input video data is to be coded as a P-frame or as a B-frame.

22. The video coder according to claim 14, wherein said encode means includes quantizing means for quantizing said first and second coded video data respectively to produce quantized data; and said coding parameters further include a quantizing parameter for controlling a quantizing characteristic of said quantizing means.

23. The video coder according to claim 22, further comprising motion detecting means for detecting motion of said input video data and providing a corresponding motion vector as a coding parameter; and wherein said encode means includes inverse quantizing means for inverse-quantizing said quantized data to provide inverse-quantized data, and wherein said inverse-quantized data is used as said reference frame of video data, and said motion compensation means compensates motion of said inverse-quantized data by using the motion vector detected by said motion detecting means.

24. The video coder according to claim 23, wherein said encode means further includes means provided at a preceding stage quantizing means for processing said input video data in a discrete cosine transform (DCT) fashion, and means for provided at a succeeding stage of said inverse-quantizing means for processing said input video data in an inverse-DCT fashion.

25. A video coding method of compressing and encoding input video data, comprising:

setting coding parameters, said coding parameters including frame structure information and predictive mode information;

storing said coding parameters;

encoding said input video data in accordance with the stored coding parameters to provide first coded video data, including the steps of generating a predictive frame of video data by compensating motion of a reference frame of video data to produce said predictive frame, the reference frame of video data being selected in accordance with said predictive mode information, and computing the difference between said input video data and said predictive frame in response to said frame structure information so as to provide said first coded video data;

ascertaining a signal to noise ration of said first coded video data varying said coding parameters in accordance with said first coded video data and the ascertained signal to noise ratio; and re-encoding said input video data in accordance with the varied coding parameters to provide second coded video data.

26. The video coding method according to claim 25, wherein each of said steps of encoding and re-encoding includes the step of quantizing said first and second coded video data respectively to produce quantized data; and said coding parameters include a quantizing parameter.

27. The video coding method according to claim 25, wherein said coding parameters further include a motion vector; and further comprising the step of effecting motion compensation of said reference frame in accordance with said motion vector.

28. The video coding method according to claim 25, wherein said frame structure information indicates that a frame of said input video data is to be coded as an intra-coded picture, a predictive-coded picture of a bidirectionally predictive-coded picture.

29. The video coding method according to claim 28, wherein said step of encoding is carried out by calculating a difference between said input video data and said predictive frame when said frame structure information indicates that said input video data is to be coded as a P-frame or as a B-frame.

30. A video coder for compressing and encoding input video data, comprising:

means for setting coding parameters;

means for storing said coding parameters;

encode means for encoding said input video data in accordance with the stored coding parameters to provide first coded video data;

means for ascertaining a signal to noise ratio of said first coded video data;

control means for varying at least one of said coding parameters in response to said first coded video data and the ascertained signal to noise ratio; and said encode means being operative to re-encode at least a portion of said input video data in accordance with the varied coding parameters to provide second coded video data.

31. The video coder according to claim 30, wherein said encode means includes quantizing means for quantizing said input video data; and said coding parameters include a quantizing parameter for controlling a quantizing characteristic of said quantizing means.

32. The video coder according to claim 31, wherein said control means varies said quantizing parameter in response to an amount of said first coded video data.

33. A video coding method for compressing and encoding input video data, comprising the steps of:

setting coding parameters;

storing said coding parameters;

encoding said input video data in accordance with the stored coding parameters to provide first coded video data;

ascertaining a signal to noise ratio of said first coded video data;

varying at least one of said coding parameters in response to said first coded data and the ascertained signal to noise ration; and re-encoding at least a portion of said input video data in accordance with the varied coding parameters to provide second coded video data.

34. The video coding method according to claim 33, wherein said step of encoding includes quantizing said input video data in accordance with a quantizing parameter; and said coding parameters include said quantizing parameter.

35. The video coding method according to claim 34, wherein said step of varying is carried out by varying said quantizing parameter in response to an amount of said first coded video data.

36. A video coder for compressing and encoding input video data, comprising:

means for setting first coding parameters;

encode means for encoding said input video data in accordance with the first coding parameters to provide first coded video data;

compare means for comparing an amount of said first coded video data with a predetermined amount of data to provide a comparison result;

means for ascertaining a signal to noise ratio of said first coded video data;

means for setting second coding parameters in accordance with said comparison result and the ascertained signal to noise ratio; and said encode means being operative to re-encode said input video data in accordance with the second coding parameters to provide second coded video data.

37. The video coder according to claim 36, wherein said encode means includes quantizing means for quantizing said input video data; and said coding parameters include a quantizing parameter for controlling a quantizing characteristic of said quantizing means.

38. The video coder according to claim 37, wherein said means for setting second coding parameters sets said quantizing parameter in accordance with said comparison result.

39. A video coding method for compressing and encoding input video data, comprising the steps of:

setting first coding parameters;

encoding said input video data in accordance with the first coding parameters to provide first coded video data;

comparing an amount of said first coded video data with a predetermined amount of data to provide a comparison result;

ascertaining a signal to noise ratio of said first coded video data;

setting second coding parameters in accordance with said comparison result and the ascertained signal to noise ratio; and re-encoding said input video data in accordance with the second coding parameters to provide second coded video data.

40. The video coding method according to claim 39, wherein said steps of encoding and re-encoding include quantizing said input video data in accordance with first and second quantizing parameters, respectively; and said first coding parameters include said first quantizing parameter and said second coding parameters include said second quantizing parameter.

41. The video coding method according to claim 40, wherein said step of setting second coding parameters is carried out by setting said second quantizing parameter in accordance with said comparison result.

\* \* \* \* \*